Feb. 12, 1952     H. T. WROBEL ET AL     2,585,714
MAGNETIC SUSPENSION
Filed March 30, 1949

Inventors
Henry T. Wrobel
Hans A. Bakke
by Crowell & Mack
Their Attorney

Patented Feb. 12, 1952

2,585,714

UNITED STATES PATENT OFFICE 2,585,714

MAGNETIC SUSPENSION

Henry T. Wrobel, Lynn, and Hans A. Bakke, Swampscott, Mass., assignors to General Electric Company, a corporation of New York Application March 30, 1949, Serial No. 84,364

6 Claims. (Cl. 308—1)

1

Our invention relates to improvements in permanent magnet structures and primarily to expedients for preventing cross-magnetization of permanent magnets. The invention has particular and important application to the permanent magnets employed for the suspension of the moving parts of measuring devices and will be explained as applied to such devices. In particular, we will illustrate our invention as applied to the improvement of the type of magnetic suspension of United States Patent No. 2,311,382, February 16, 1943, to Hansen, and assigned to the same assignee as the present invention.

Figure 1:
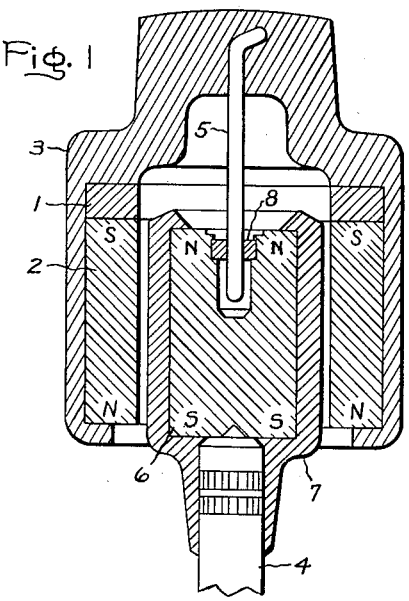
Figure 2:
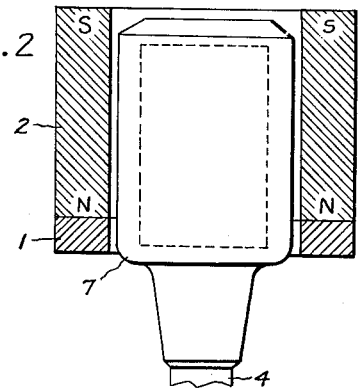
Figure 3:
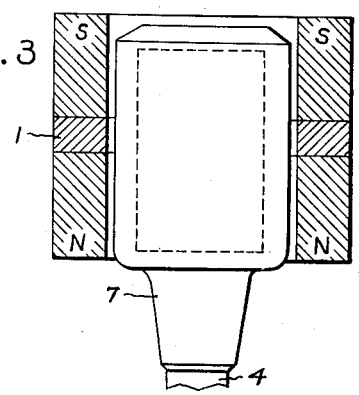
Figure 5:
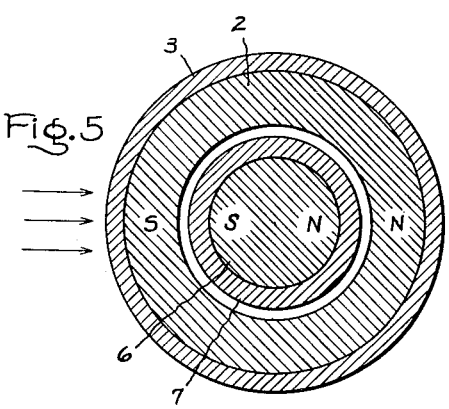
Figure 4:
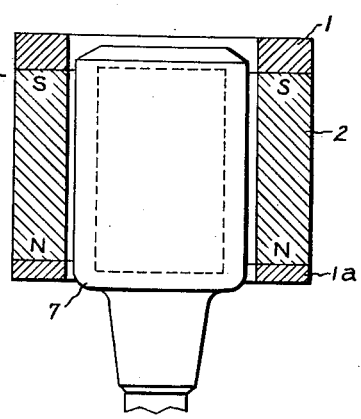
Figure 6:
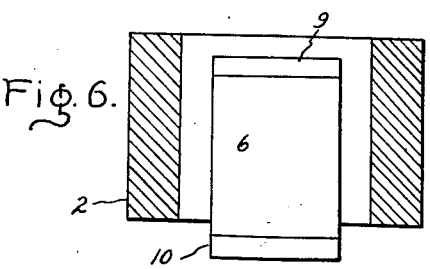

The features of our invention which are believed to be novel and patentable will be pointed out in the claims appended hereto. For a better understanding of our invention reference is made in the following description to the accompanying drawings in which Fig. 1 represents in cross section a magnetic suspension for vertical shafts embodying our invention, where a cross-magnetization preventing flux shunt is provided in contact with the upper end of the outer stationary permanent magnet of the suspension. Figs. 2 and 3 represent the cross-magnetization preventing shunt at the bottom and at the center of the outer permanent magnet or permanent magnet structure of the suspension, respectively. Fig. 4 represents an embodiment where shunts are provided at both the top and bottom of the outer permanent magnet. Fig. 5 shows the suspension magnets in horizontal cross section indicating cross-magnetization. Fig. 6 represents a modification of our invention where the inner magnet is provided with protective shunts. In all figures the suspensions are represented in cross section except for the rotor elements in Figs. 2, 3, 4, and 6.

Referring now to Fig. 1, we have shown here a type of magnetic suspension in general structurally similar to that of Fig. 4 of Patent No. 2,311,382, except that it is provided with a washer 1 of nonpermanent magnetic material, such as cold rolled steel or soft iron at the top of and in contact with, and of the same inner and outer diameter as, the outer cylindrical permanent magnet 2 of the suspension. The outer permanent magnet 2 with the washer-shaped shunt 1 is supported in a housing 3 made of nonmagnetic conductor material which may be formed by die-casting and serves to hold this stationary part of the suspension in the meter, instrument, or other device in which it is to be used, and is designed to be used at the top of the vertical shaft represented at 4 to be supported. The housing 3 also secures a guide pin 5 extending downward on the center axis of the assembly. At the top of the rotary shaft 4 is secured an inner cylindrical permanent magnet 6 which is secured to the shaft by die-cast material 7 of nonmagnetic conductor material and which can be made in skeleton construction. The inner permanent magnet has a central recess at its top in which there is secured a ring guide bushing 8 and into which the guide pin 5 extends with a close but not tight fit to center and guide the upper end of the rotary shaft 4. The outer and inner permanent magnets are uniformly polarized in their axial directions in opposite directions as indicated by the N and S polarity marks thereon, the lines of polarization being substantially rectilinear, and their relative elevation is adjusted with the inner rotary magnet sufficiently below the level of the outer stationary magnet as to produce the desired magnetic lifting effect on the rotary shaft and any instrument or meter part, not shown, carried by the shaft. The lower end of the shaft may be guided as shown and described in the Hansen patent mentioned above.

The magnetic washer 1 in contact with and at the top of the outer magnet 2 tends to elongate upwardly the flux pattern produced by such permanent magnet slightly, and this is taken into consideration in adjusting the relative elevations of the inner and outer permanent magnets, and the guide pin 5, but otherwise does not alter the magnetic suspension lifting action and is not intended to augment such lifting action. This magnetic part 1 being in series rather than in shunt to the useful flux of the permanent magnet system causes no detrimental action on the lifting strength of such system. The purpose of the washer shaped part 1 of high permeability, low coercive force material is to prevent or reduce cross-magnetization of the permanent magnets of the suspension by surge fields such as may be encountered in the use of meters and to short-circuit any cross-magnetization flux of the outer permanent magnet that may exist accidentally due to faulty magnetization or non-uniformities in the magnets or otherwise, and with respect to any such unwanted cross-magnetizing flux the part 1 acts as an effective shunt. In a magnetic suspension of the type and material described in the Hansen patent without the shunt 1 in direct contact with the outer magnet 2 as in the present invention, it has been found possible to produce cross-magnetization of the suspension by an intense flux surge having a component crosswise of the axis of magnetization of the suspension magnets such, for example, as might be indicated by the arrows in Fig. 5. If sufficient such cross-magnetization occurs in the permanent magnetic material it will leave polarizing effects such as are represented in Fig. 5 by the polarity designations N and S. While such cross-polarization is most likely to occur in the outer magnet, such cross-polarization can occur even in the inner permanent magnet when it is rotating because the flux which can cause such polarization is most likely to be in the form of a high sudden surge caused by some unusual condition as, for example, by lightning. While such cross-magnetization may not alter the lifting power of the suspension and may be quite small in comparison with the axial magnetization of the system magnets, it is nevertheless detrimental, particularly where it occurs in a measuring device such as a watthour meter or indicating type of measuring instrument where the magnetic suspension is most useful in reducing bearing friction.

Such cross-magnetization produces a torque tending to cause rotation of the shaft away from the position of relative rotation where the cross-magnetization originally occurred. Thus, in Fig. 5, the cross-magnetization represented tends to repel the inner magnet and cause it to rotate to a position 180 degrees from that shown. In this latter position, 180 degrees from that shown, a locking tendency will then exist. This will increase the starting watts in a watthour meter and prevent rotation on certain light loads, and cause the meter to run slow when it operates. In a deflecting type measuring instrument it will throw off the calibration to an extent to which the cross-magnetization torque is significant compared to the measurement torque and will differ at different deflections. Fig. 5 is intended to represent in general the predominating cross-magnetization which occurs with a straight cross-magnetization field, and it does not necessarily represent all of the details of such cross-magnetization. It is believed also that the details of cross-magnetization vary with the direction or curvature of the surge field, the kind of permanent magnet material used, and the geometry of such magnets.

Our invention has for its purpose substantially to prevent the possibility of such detrimental cross-magnetization and to reduce its detrimental effects in case it occurs, and to provide a compact magnetic suspension which is otherwise immune to demagnetization detrimental to its lifting power and stability.

The shunt washer part 1 being made of a nonpermanent magnet high permeability material has a very much higher permeability than that of the material of which the permanent magnets are made, and hence, any cross-magnetic field of the general direction represented by the arrows in Fig. 5 in the vicinity of the suspension will in a large measure be diverted to and cross through the washer shaped shunt 1, where it will do no harm. This affords substantial protection to both the inner and outer magnets of the suspension. In case any cross-magnetization does occur it will be very much less than if no such shunt were present, and will be largely confined to the outer magnet and because the shunt is of very much higher permeability than the permanent magnet material, any cross-magnetization of the outer magnet which does exist will be largely shunted by such shunt and to that extent rendered harmless.

The shunt 1 of Fig. 1 may also be placed at the bottom of the outer magnet as shown in Fig. 2, or inserted in the center of the outer permanent magnet as shown in Fig. 3, or divided and shunt washer sections 1 and 1a placed at both top and bottom as shown in Fig. 4. Some advantage can be obtained by correct proportioning of top and bottom washer thicknesses, for example, with a .070" top shunt a .03" bottom shunt has been found a little more effective than a .06" bottom shunt. In Fig. 6, 9 and 10 represent high permeability laminations for the inner magnet 6. All of these arrangements, except those shown in Figs. 2 and 6, have been tried out and all are quite effective in reducing the detrimental results of that which would otherwise occur because of cross-magnetization, some being more effective than others, depending to some extent upon where cross surge flux concentration is located relative to the suspension.

In the manufacture, polarization and stabilization of permanent magnets of the character and for the purpose in question, it is desirable that the cylindrical magnets be symmetrical as to dimensions, free from voids, and uniform as to material, polarization and stabilization because then if they be concentrically positioned, their flux patterns will be uniform and symmetrical and the suspension will function free from side thrust and hysteresis losses. tI may happen that for some reason a magnet, such as the outer magnet 2, will be used which has some undetected nonuniformity which would be productive of a nonsymmetrical flux pattern. In such a case the shunt 1 acts like a pole piece to the magnet and tends to make more symmetrical the flux pattern that might otherwise be unsymmetrical, and in this respect the flux shunts described are beneficial independently of their function of protection from surge fields as previously described. It is of course essential that such flux shunts also be symmetrical and concentric to the center of the suspension system.

Thus far we have not discussed the kind of permanent magnet material or materials which are best to use in the magnetic suspension described. Hansen in his patent above referred to specifies a copper-nickel-cobalt alloy, more particularly described in United States Patent No. 2,170,047, and known as cunico. This is a high coercive force material which is easily machined. Our invention is quite effective when employing this material for the permanent magnets of the suspension. However, we prefer to use a material, at least for one of the magnets of the suspension, which is made magnetically anisotropic in the direction of the desired permanent magnet flux path in the manner described in United States Patent No. 2,295,082, September 8, 1942. The cunico material is not anisotropic, and the anisotropic property is desirable because when the permanent magnets of the suspension are made anisotropic in their axial directions, it becomes more difficult to cross-magnetize them. We prefer, therefore, to employ at least one permanent magnet in our suspension which is anisotropic and also protected with our direct contact shunt which is in series with the main field and in shunt relation to any cross fields. A permanent magnetic material suitable for this purpose is the easily machinable copper-nickel-iron alloy of United States Patent No. 2,196,824, April 9, 1940, known as cunife.

In the development of our invention we have tried various permanent magnetic materials and different protective shunt arrangements in a magnetic suspension of a watthour meter and have made comparative starting watt tests thereon before and after subjecting the suspension to an intense cross-magnetizing flux surge.

We have found that the use of our direct contact shunt and the use of anisotropic material and various combinations thereof are all very effective in reducing cross-magnetization difficulties. The combinations listed in the following table were found to be particularly good. Where cunife is mentioned it was anisotropic.

Table

| Material | Outer Magnet Length 0.4 inch | | Inner Magnet Length 0.4 inch Material |
|---|---|---|---|
| | Shunt | | |
| | Position | Thickness | |
| | | Inch | |
| Cunico | Top | 0.07 | Cunico. |
| | Bottom | 0.03 | |
| Cunife | Top | 0.07 | Cunife. |
| Cunife | Top | 0.07 | Cunife. |
| | Bottom | 0.03 | |
| Cunico | Top | 0.07 | Cunife. |
| Cunico | Center | 0.07 | Do. |
| Cunico | Top | 0.07 | Cunife. |
| | Center | 0.01 | |
| | Bottom | 0.05 | |

Considerations other than cross-magnetization, such as the influence of temperature variations on different kinds of permanent magnets, may influence the choice to be made for any given installation. It is of course important that the choice of permanent magnet materials, such as we have specified, and their stabilization also be such that the suspension will serve its main purpose of supporting the weight of a rotary element at a substantially fixed suspension level indefinitely under other conditions likely to be encountered, as explained in the Hansen patent.

While we have shown a particular embodiment of our invention, it will be understood, of course, that we do not wish to be limited thereto since many modifications may be made, and we therefore contemplate by the appended claims to cover any such modifications as fall within the true spirit and scope of our invention.

What we claim as new and desire to secure by Letters Patent of the United States is:

1. A permanent magnet assembly comprising a pair of relatively rotatable permanent magnets of cylindrical shape one being hollow and freely and concentrically surrounding the other, said two magnets being polarized in the direction of their axes in opposite directions, and means for protecting said assembly against cross-polarization of the magnets, comprising a washer-shaped piece of high permeability low coercive force material secured in direct contact to the outer magnet at one end thereof and concentric therewith, said piece conforming in size and shape to the cross section of such outer magnet at the point of contact and having a thickness between ⅕ and ½ that of such magnet.

2. A permanent magnet assembly comprising a pair of cylindrical permanent magnets of equal length polarized oppositely in the direction of their axes, at least one of said magnets being anisotropic, one of said magnets being hollow and concentrically surrounding the other with sufficient clearance to allow of their free relative rotation, said outer permanent magnet having an integral extension at one end composed of high permeability low coercive force material forming an end surface for such outer magnet of uniform thickness of the order of ⅛ the length of such permanent magnet and serving to reduce the possibility of cross-magnetization of both magnets.

3. A permanent magnet assembly comprising a pair of cylindrical permanent magnets, of substantially equal lengths, one magnet being hollow and freely and concentrically surrounding the other, said magnets being polarized in their axial directions in opposite directions, the inner magnet being anisotropic and the outer magnet being non-anisotropic and provided with a pole face end surface on one end made of a high permeability low coercive force material of a uniform thickness of the order of 7/40 the length of such permanent magnet.

4. A permanent magnet assembly comprising a pair of cylindrical permanent magnets of substantially equal lengths, one magnet being hollow and freely and concentrically surrounding the other, said magnets being polarized in opposite axial directions and both being anisotropic, said outer magnet being provided with an end surface of uniform thickness of the order of 7/40 of the length of such permanent magnet and made of a low coercive force high permeability magnetic material and serving to reduce the possibility of cross-magnetization of both magnets.

5. A permanent magnet assembly comprising a cylindrical inner anisotropic permanent magnet and an integral outer hollow cylinder made up of two non-anisotropic permanent magnet hollow cylindrical parts separated by a washer-shaped section of high permeability low coercive force material, such section being of uniform thickness of the order of 7/40 of the total length of said two permanent magnet parts, the length of permanent magnet material in the inner permanent magnet and in the outer hollow cylinder being approximately the same, the inner permanent magnet being polarized in one axial direction and the outer permanent magnets being polarized in the opposite axial direction, and means for supporting the inner magnet concentrically within the outer cylinder.

6. A permanent magnet assembly comprising a pair of cylindrical permanent magnets oppositely polarized in the directions of their axes, one of said magnets being hollow and concentrically surrounding the other, and means for reducing the possibility of cross-polarization of said magnets by cross-magnetization surge fluxes comprising at least one lamination of high permeability low coercive force magnetic material extending crosswise and in contact with one of said magnets, said lamination being unsaturated by the flux of the permanent magnets so as to be effective as a shunt for cross-magnetizing surge fluxes originating from the outside, said lamination conforming in size to the cross section of such magnet and having a uniform axial thickness between ⅕ and ½ that of such magnet.

HENRY T. WROBEL.
HANS A. BAKKE.

REFERENCES CITED

The following references are of record in the file of this patent:

UNITED STATES PATENTS

| Number | Name | Date |
|---|---|---|
| 2,102,409 | Faus | Dec. 14, 1937 |
| 2,240,035 | Catherall | Apr. 29, 1941 |
| 2,340,122 | Hansen | Jan. 25, 1944 |

FOREIGN PATENTS

| Number | Country | Date |
|---|---|---|
| 558,709 | Great Britain | Jan. 18, 1944 |